United States Patent Office 3,342,974
Patented Sept. 19, 1967

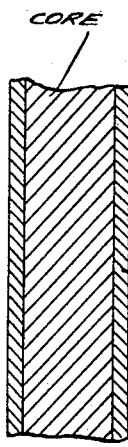

3,342,974
ARC WELDING ELECTRODE PROVIDING WELDS HAVING HIGH YIELD AND RUPTURE VALUE
Werner Wallner, Mariestadsvagen 28, Johanneshor, Sweden
Filed Oct. 11, 1965, Ser. No. 494,609
Claims priority, application Sweden, Nov. 18, 1961, 11,498/61
8 Claims. (Cl. 219—146)

This application is a continuation-in-part of my application S.N. 238,441, filed Nov. 19, 1962, and now abandoned.

Lately, steel having increased yield limit and rupture limit has come into considerable use, inter alia in the manufacture of pressure vessels and the like. Electrodes, the welding material of which would appear according to analysis, to be well suited, have been found unusable since welding materials and welding joints do not fulfill the higher requirements for these steels.

The present invention relates to an electrode which in welding provides a welding material and a welding joint having the high yield and rupture limits which are required. The core of the electrode consists of an unalloyed or low-alloy steel, hereafter called low-alloy steel, and a coating around said core. It is characteristic of the invention that the coating comprises 15–35% by weight of limestone, 15–35% by weight of calcium fluoride, 0–10% rutile, 0–5% ferro-silicon, 0–10% silicon-manganese, 0–5% ferro-molybdenum, 0–50% iron powder, 0.005–0.050% of boron in a boron containing material, such as ferro-boron, the content of ferro-boron being 0.05%–0.25%, a small percentage of at least one of the metals aluminum, titanium, zirconium and vanadium, the total percentage of said metals being 0.001–0.20% preferably 0.01–0.20%. The relation between, on the one hand, the nitride-forming materials aluminum, titanium, zirconium and vanadium and, on the other hand, boron, is such that, with smaller content of nitride-forming materials and thus greater risk of unbound nitrogen and oxygen, there must be present greater amounts of boron, as in this case some of the boron may be bound by said nitrogen and oxygen and there must be boron left in the weld in soluble form (not in chemical combination with $N_1$ or $O_2$) to get the increase in material properties to be attained by the present invention. With greater amounts of the nitride-forming materials, the amounts of boron may be kept somewhat lower.

In a preferred embodiment of the invention, especially high qualities of the welds are obtained. The coating has in this case the composition of 20–30% by weight of limestone, 20–30% of calcium fluoride, 3–7% rutile, 2–4% ferro-silicon, 5–8% silicon-manganese, 1–3% ferro-molybdenum, 30–40% iron powder, 0.10–0.20% ferro-boron, 0.002–0.10% ferro-vanadium and 0.001–07% ferro-titanium.

In using said electrode the welding material is to consist of the following ingredients:

B=0.0005–0.015%, preferably 0.001–0.012%
Mo=0.1–1.0%, preferably 0.2–0.8%

Further, to the coating is also added one or more nitrogen binding constituents such as Al, Ti, Zr, V or the like, either in the form of pure metals or in the form of metal alloys. The invention is intended to prevent the combination of nitrogen with boron in the welding material. Such combination of nitrogen with boron would otherwise counteract the increased yield and rupture obtained with the small percentage of boron according to the invention. It has been found that if the welding material is to be heat-treated, for example standardized or annealed, the addition of these nitrogen combining constituents to the coating is of great importance. Boron will thus occur in the welding material in soluble form.

In the drawing:
FIG. 1 shows in cross-section an electrode according to the invention; and
FIG. 2 shows in cross-section a welded joint produced with such an electrode.

With comparison tests using an electrode according to the invention and a directly corresponding electrode outside the scope of the invention, resistance values were obtained which clearly show the essential points in the invention.

The electrodes have the following composition:

| | Electrode 1 (outside the invention) (percent) | Electrode 2 (invention) (percent) |
|---|---|---|
| Limestone | 24 | 24 |
| Calcium fluoride | 24 | 24 |
| Rutile | 5.5 | 5.5 |
| Ferro-silicon | 3.25 | 3.25 |
| Silicon-manganese | 6.75 | 6.75 |
| Ferro-vanadium | 0.009 | 0.009 |
| Ferro-molybdenum | 2.0 | 2.0 |
| Ferro-titanium | 0.006 | 0.006 |
| Iron powder | 35 | 34.85 |
| Boron containing material such as ferro-boron | | 0.15 |

With these compositions of the coating the electrodes were manufactured with a core rod diameter of 4 mm. and an outer diameter of 6.5 mm. The carbon percentage of the core rod was chosen as 0.08%. Silicate of potassium was chosen as binding agent.

When welding with these electrodes, the following welding analyses in percentages were obtained.

| | Electrode 1 | Electrode 2 |
|---|---|---|
| C | 0.08 | 0.08 |
| Si | 0.45 | 0.45 |
| Mn | 1.48 | 1.47 |
| Mo | 0.51 | 0.52 |
| B | | 0.001 |
| Ti | | 0.002 |
| V | | 0.005 |

On testing the following strength values were obtained with completely welded test rods:

| | Electrode 1 | Electrode 2 |
|---|---|---|
| Yield limit, kp./mm.$^2$ | 61.2 | 67.0 |
| Rupture limit, kp./mm.$^2$ | 62.5 | 68.8 |
| Expansion 5xd, percent | 25.0 | 25.0 |
| Contraction, percent | 72.0 | 70.0 |

From this it is clear that even such a small amount of boron as 0.001% is sufficient to give an increased yield limit and rupture limit of not less than about 10%. Continued tests showed that a boron percentage in the welding material of more than 0.015% may involve a risk of crack formation in the welding material during cooling. It has been found that the desired effect is obtained if the coating and core rod are selected so that the weld has a composition according to the following:

C=Max. 0.20%
Si=max. 0.80%
Mn=max. 2.0%
Mo=0.1–1.0%, preferably 0.2–0.8%
B=0.0005–0.015%, preferably 0.001–0.012% (boron in soluble form)

I claim:

1. Welding electrode giving a welding deposit with high yield and rupture limits, comprising a core of low alloy steel and a coating around said core, said coating comprising 20–30% by weight of limestone, 20–30% calcium fluoride, 3–7% rutile, 2–4% ferro-silicon, 5–8% silicon-manganese, 1–3% ferro-molybdenum, 30–40% iron powder, 0.100–0.20% ferro-boron and 0.01–0.15% of at least one of the nitrogen-binding metals aluminum, titanium, zirconium and vanadium, the amount of such nitrogen-binding metal being sufficient to ensure the presence of some boron in soluble form in a weld produced from such electrode.

2. Welding electrode giving a welding deposit with high yield and rupture limits, comprising a core of low alloy steel and a coating around said core, said coating comprising 24% by weight of limestone, 24% calcium fluoride, 5.5% rutile, 3.25% ferro-silicon, 6.75% silicon manganese, 2.0% ferro-molybdenum, 34.85% iron powder, 0.15% ferro-boron, and a small percentage of at least one of the metals aluminum, titanium, zirconium and vanadium.

3. A welding electrode providing a weld deposit with high yield and rupture limits, comprising a core of low carbon low-alloy steel and a coating on said core, said coating containing, in addition to a slag-forming composition consisting principally of limestone and a fluoride as well as deoxidizing alloys and a proportion of iron powder not exceeding 50%, 1 to 5% of ferro-molybdenum, 0.005 to 0.05% of boron, and 0.001 to 0.20% of a metal selected from the group of nitrogen-binding metals consisting of aluminum, titanium, zirconium and vanadium, the amount of said nitrogen-binding metal being such as to ensure the presence of some boron in soluble form in the weld metal deposited by said electrode.

4. A welding electrode as claimed in claim 3, in which the boron is in the form of ferro-boron.

5. A welding electrode providing a weld deposit with high yield and rupture limits, comprising a core of low carbon low-alloy steel and a coating on said core, said coating consisting essentially of 15 to 35% by weight of limestone, 15 to 35% of calcium fluoride, 1 to 5% of ferro-molybdenum, 0.005 to 0.05% of boron, and 0.001 to 0.20% of a metal selected from the group of nitrogen-binding metals consisting of aluminum, titanium, zirconium and vanadium, the amount of said nitrogen-binding metal being such as to ensure the presence of some boron in soluble form in the weld metal deposited by said electrode.

6. A welding electrode as claimed in claim 5, in which the boron is present in the form of ferro-boron.

7. A welding electrode as claimed in claim 5 the coating of which additionally contains up to 15% of deoxidizing ferro-alloys.

8. A welding electrode as claimed in claim 5 which additionally contains up to 50% of iron powder.

References Cited
UNITED STATES PATENTS

| | | | |
|---|---|---|---|
| 1,528,878 | 3/1925 | Holslag | 219—146 |
| 1,745,267 | 1/1930 | Pennington | 219—146 |
| 2,871,117 | 1/1959 | Korchynsky | 75—123 |
| 2,973,428 | 2/1961 | Pfeiffer | 219—146 X |

OTHER REFERENCES

"Welding Engineer," February 1943, pp. 58, 59.

Comstock: "Titanium in Iron and Steel" (1955), pp. 152–6, 159, 160, John Wiley and Sons, New York.

RICHARD M. WOOD, *Primary Examiner.*

ANTHONY BARTIS, *Examiner.*

R. F. STAUBLY, *Assistant Examiner.*